United States Patent
Miyazaki et al.

(10) Patent No.: US 7,142,309 B2
(45) Date of Patent: Nov. 28, 2006

(54) METHOD AND DEVICE FOR MEASURING HALF-WAVE VOLTAGE OF MACH-ZEHNDER TYPE OPTICAL MODULATOR

(75) Inventors: Norikazu Miyazaki, Tokyo (JP); Ryo Shimizu, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 236 days.

(21) Appl. No.: 10/486,610

(22) PCT Filed: Jul. 31, 2002

(86) PCT No.: PCT/JP02/07784

§ 371 (c)(1),
(2), (4) Date: Jul. 26, 2004

(87) PCT Pub. No.: WO03/016853

PCT Pub. Date: Feb. 27, 2003

(65) Prior Publication Data

US 2004/0247219 A1    Dec. 9, 2004

(30) Foreign Application Priority Data

Aug. 10, 2001 (JP) .............................. 2001-243816

(51) Int. Cl.
*G01B 9/02* (2006.01)
(52) U.S. Cl. .................. 356/477; 356/477; 359/237; 359/279; 385/3; 385/5
(58) Field of Classification Search ............... 356/477, 356/479, 481
See application file for complete search history.

(56) References Cited

U.S. PATENT DOCUMENTS

| | | | | |
|---|---|---|---|---|
| 5,655,034 A | * | 8/1997 | Ishizaka et al. | 385/3 |
| 6,204,954 B1 | * | 3/2001 | Nagarajan | 359/279 |
| 6,262,828 B1 | * | 7/2001 | Akiyama et al. | 359/237 |
| 6,400,490 B1 | * | 6/2002 | Hosoi | 359/254 |
| 6,956,653 B1 | * | 10/2005 | Lam et al. | 356/477 |

FOREIGN PATENT DOCUMENTS

| | | | |
|---|---|---|---|
| JP | 03-123828 | | 5/1991 |
| JP | 03123828 A | * | 5/1991 |
| JP | 03139653 A | * | 6/1991 |
| JP | 10/148801 | | 6/1998 |
| JP | 2001-159749 | | 6/2001 |

* cited by examiner

*Primary Examiner*—Gregory J. Toatley, Jr.
*Assistant Examiner*—Denise B Anderson
(74) *Attorney, Agent, or Firm*—Champman and Cutler LLP

(57) ABSTRACT

A method and a device for measuring the half-wave voltage of a Mach-Zehnder type optical modulator accurately and without depending on the bias variation of an optical modulator. The method of measuring the half-wave voltage of the Mach-Zehnder type optical modulator the steps of applying a high-frequency AC signal 34 and a monitoring low-frequency AC signal 35 in a superimposed manner to a Mach-Zehnder type optical modulator 1, or applying the both respectively to separately constituted electrodes, and observing the low-speed response of an output light from the optical modulator 1, wherein the half-wave voltage at a frequency to be measured of the Mach-Zehnder type optical modulator 1 is measured by using the voltage amplitude of the high-frequency AC signal 34 when the intensity change of an out put light by the monitoring low-frequency AC signal 35 is almost zero with the voltage amplitude of the high-frequency AC signal 34 kept variable.

12 Claims, 10 Drawing Sheets

(b)

(a)

METHOD AND DEVICE FOR MEASURING HALF-WAVE VOLTAGE OF MACH-ZEHNDER TYPE OPTICAL MODULATOR

BACKGROUND OF THE INVENTION (1) Field of the Invention

Present invention relates to method and device for measuring half-wave voltage (AC half-wave voltage) of a Mach-Zehnder type optical modulator (hereinafter refer to as MZ type optical modulator), especially a method and a device for measuring the half-wave voltage at high frequency of a MZ type optical modulator, which corresponds to high frequency modulation used in high-speed and high-capacity optical fiber communications.

(2) Related Art Statement

An optical modulator is the primary element, which is used in transmitting parts of optical communications, especially, in recent high-speed and high-capacity optical communication, MZ type optical modulator, which is made by using $LiNbO_3$ (LN) is used in huge range with its features such as high-speed, wide wavelength band, and low-chirp.

As shown in FIG. 1, MZ type optical modulator 1 is composed of light guide 2 which is for guiding light waves, on the substrate that has an electro-optical effect, and the electrodes (not shown) which is for applying high-speed modulation signal of micro wave band to said light waves, and so on. The principle of MZ type optical modulator's operation is that the input light from one end of the light guide 2 is divided on the way and because the lights pass inside the substrate of which the refractive index has changed dependent on the amount of electronic signal voltage which applied from signal source, speed difference occurs between mutual divided lights, and as the two divided lights converge, phase difference occurs, and the combined output light shows an intensity change which respond to said electronic signal.

The FIG. 2 shows the change of output light (I) in relation to the change of input voltage (V) of signal source 3 which is applied to MZ type optical modulator 1, and generally, as the input voltage V increases, light output I draw a curve that vibrates as a sine wave in certain range. As in FIG. 2, an input voltage range between minimum point and maximum point of the light output is called half-wave voltage $V_\pi$, and when ON/OFF switching control using optical modulator in optical communication is handled, the value $V_\pi$ is important to determine the voltage of electronic signal which is applied to optical modulator.

Even when the same optical modulator is used, half-wave voltage changes according to the electronic signal frequency which is applied to optical modulator, and also, as optical communication become high-speed and high-capacity recently, drive frequency of optical modulator has also become high, so it is required to measure accurate half-wave voltage at 10 GHz or higher frequency.

To measure half-wave voltage, there are several methods such as FIG. 3 which shows the way to observe the light output directly (prior example 1), or as the FIG. 5 shown in U.S. Pat. No. 6,204,954 which is a method using the average power of output light (prior example 2).

In the prior example 1, as shown in FIG. 3, light from laser source 4 enters to MZ type optical modulator 1, and at the same time, the voltage which superimposed bias voltage from bias DC power 32 to high-frequency AC signal 31 by using bias T 33 is applied to MZ type optical modulator 1. Then the light from MZ type optical modulator 1 is detected by using high-speed photo detector 51, and by observing the detected power on sampling oscilloscope 52, half-wave voltage is measured.

The method for measuring by prior example 1 is that when the relation between input voltage V and output light I (V-I characteristic) of MZ type optical modulator 1 is like graph A in FIG. 4, if bias voltage VB is superimposed to high-frequency AC signal which has peak—peak voltage amplitude value Vp-p and input voltage as graph B is applied to MZ type optical modulator 1, output light becomes like graph C, and the wave form of graph C is observed directly on sampling oscilloscope 52.

As carrying this direct observation, by adjusting the voltage value of $V_{p-p}$ and $V_B$ to make peak—peak amplitude of graph C maximum and measuring $V_{p-p}$ at its peak, half-wave voltage $V_\pi$ of MZ type optical modulator 1 will be determined ($V_\pi = V_{p-p}$).

However, with the method of measuring by prior example 1, it is hard to observe an accurate light waveform (graph C in FIG. 4) at high-frequency over 10 GHz, because of the problem with frequency characteristics of light receiving system such as high-speed photo detector 51. Therefore, it cannot measure half-wave voltage precisely.

On the other hand, in the prior example 2, as shown in FIG. 5, the voltage of high-frequency AC signal 31 superposed with bias voltage from DC power 32 by bias T 33, is applied to the MZ type optical modulator 1 which the laser is passing through. Then it is comprised to diverge the light from MZ type optical modulator 1 at light coupler 53, to detect one light by light power meter 54 and another light by photo detector 55, and to introduce the detected power of the photo detector to spectrum analyzer 56.

The method of measuring by the prior example 2 is that when relationship between input voltage V and light output I (V-I characteristics) of MZ type optical modulator 1 shows the pattern like graph A in FIG. 6, after adjusting the bias voltage $V_B$ to the input voltage showing peak volume in graph A of V-I characteristic (bias point adjustment), it is carried out to measure average power volume of light output (graph C1) in the case (graph B1) of superposing high-frequency AC signal which has peak—peak voltage amplitude volume $V_{p-p}$ to bias voltage $V_B$, light output volume (graph C2) in not adding high-frequency AC signal (only bias voltage $V_B$, graph B2), and $V_{p-p}$ of high-frequency AC signal. Then by using that the V-I characteristic becomes to sine function, it is possible to find out half-wave voltage $V_\pi$ of MZ type optical modulator.

Handling with the method of measuring by the prior example 2, it is able to measure an accurate half-wave voltage at high-frequency, but the bias point adjustment for MZ type optical modulator is necessary and there is a problem that an accurate half-wave voltage measurement is difficult when there is a fluctuation in output light because of the bias point variation. Also, there are many parameters to use for half-wave voltage calculation so the calculation is becoming cumbersome and complicated.

Present invention solves these problems and offers a method and device for measuring that is able to measure half-wave voltage of MZ type optical modulator accurately at high-frequency, does not depend on the bias point variation of the optical modulator, and in which the parameters for calculation are simple.

SUMMERY OF THE INVENTION

In order to solve the problems above, the method for measuring half-wave voltage of Mach-Zehnder type optical modulator related to claim 1 is characterized in that it comprises the step of applying a high-frequency AC signal of a frequency under test and a monitoring low-frequency AC signal in a superimposed manner to a Mach-Zehnder type optical modulator, or applying the both respectively to its separately constituted electrodes, and the step of observing the low-speed response of an output light from the optical modulator, wherein the half-wave voltage at a frequency under test to be measured of the Mach-Zehnder type optical modulator is measured by using the voltage amplitude of said high-frequency AC signal when the intensity change of an out put light by said monitoring low-frequency AC signal is almost zero with the voltage amplitude of said high-frequency AC signal kept variable.

The method for measuring half-wave voltage of the Mach-Zehnder type optical modulator related to claim 2 is characterized in that, in the method for measuring half-wave voltage of the Mach-Zehnder type optical modulator as claimed in claim 1, when the intensity change of an out put light by said monitoring low-frequency AC signal is almost zero, the relationship between the peak—peak voltage amplitude value $V_{p\text{-}p}$ of the voltage amplitude of said high-frequency AC signal and the half-wave voltage value $V_\pi$ of Mach-Zehnder type optical modulator satisfies this relational expression.

$$J_0(\pi V_{p\text{-}p}/(2V_\pi))=0 \ \{J_0 \text{ is Bessel function at 0 order}\}$$

The method of measuring half-wave voltage of the Mach-Zehnder type optical modulator related to claim 3 is characterized in that, in the method for measuring half-wave voltage of the Mach-Zehnder type optical modulator as claimed in claim 1, in the case of setting a minimum value of the peak—peak voltage amplitude value of the voltage amplitude of said high-frequency AC signal when the intensity change of an output light by said monitoring low-frequency AC signal is almost zero, as $V_{p\text{-}pmin}$, the half-wave voltage value $V_\pi$ of Mach-Zehnder type optical modulator satisfies this relational expression.

$$\pi V_{p\text{-}pmin}/(2V_\pi)=2.405$$

The device of measuring half-wave voltage of the Mach-Zehnder type optical modulator related to claim 4 is characterized in that the device makes it possible to measure half-wave voltage of the Mach-Zehnder type optical modulator, by using the method for measuring half-wave voltage of the Mach-Zehnder type optical modulator as claimed in whichever of claim 1 to claim 3.

DETAILED DESCRIPTION OF THE INVENTION

Hereinafter, the present invention will be concretely described with preferred examples, but the scope of the present invention is not restricted to these preferred examples.

Figure 1:
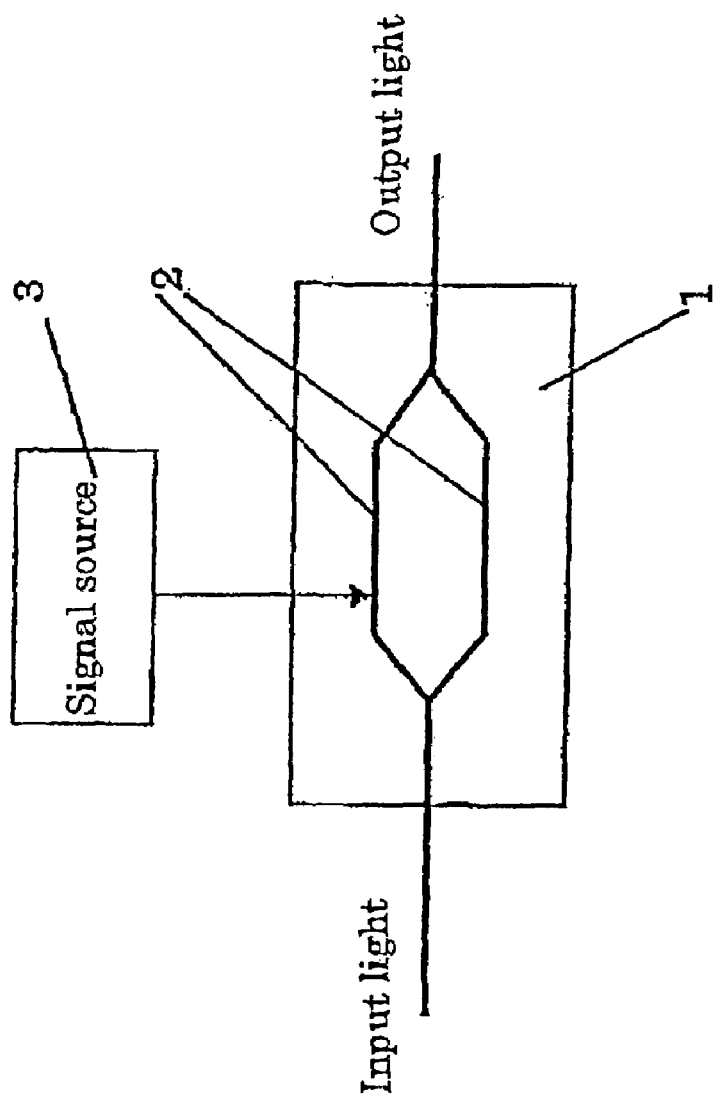
FIG. 1 is a diagrammatic illustration of Mach-Zehnder type optical modulator.
Figure 2:
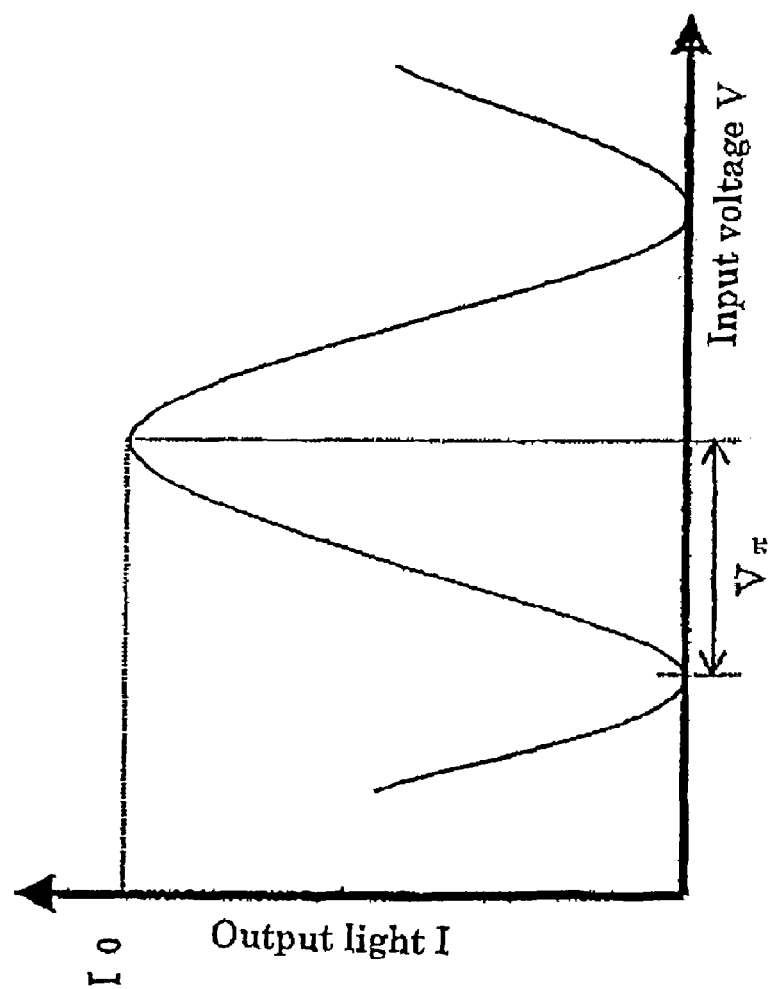
FIG. 2 is a graph, which shows V-I characteristic of Mach-Zehnder type optical modulator.
Figure 3:
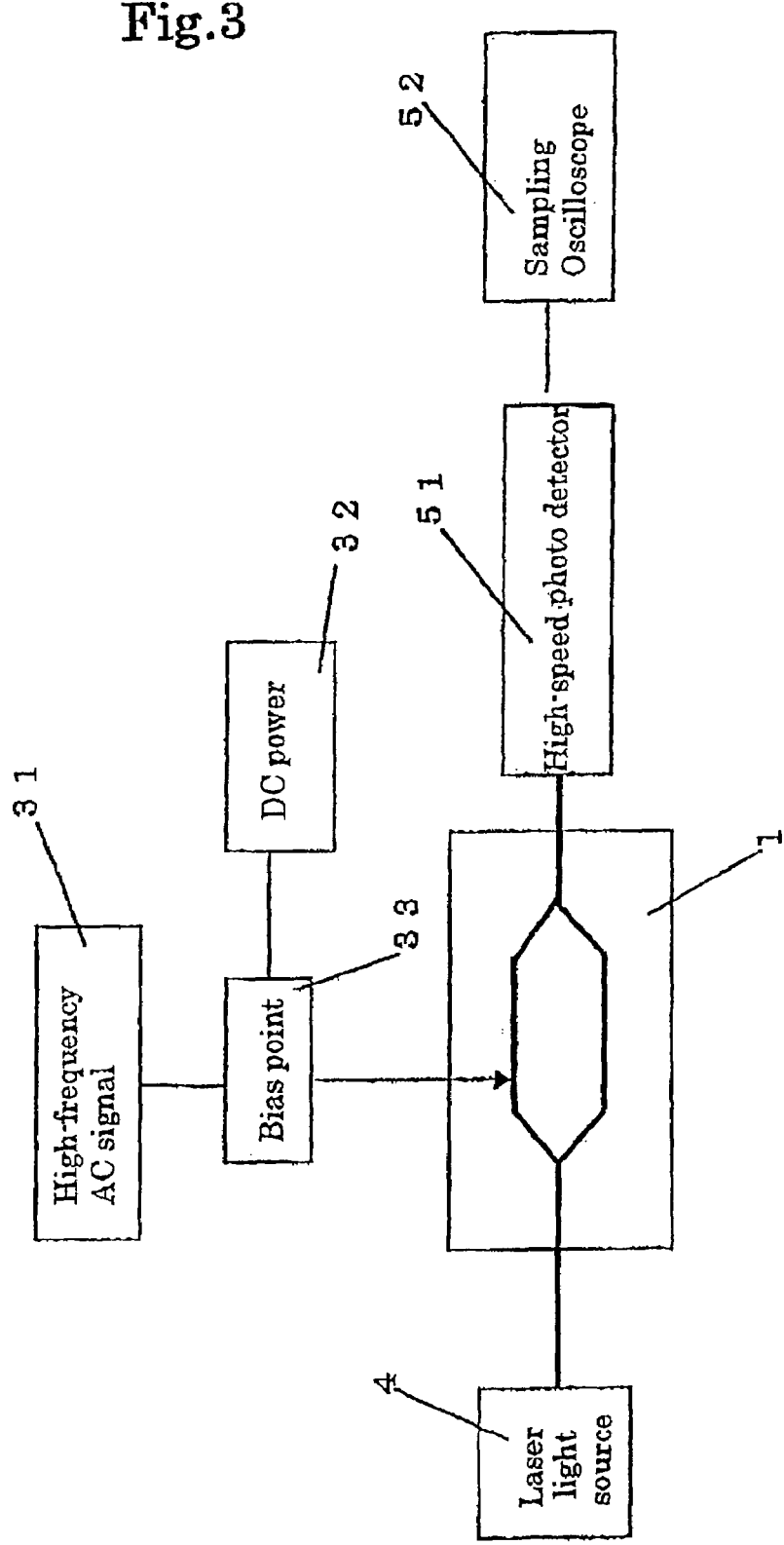
FIG. 3 is a diagrammatic illustration, which shows the method for measuring of the prior example 1.
Figure 4:
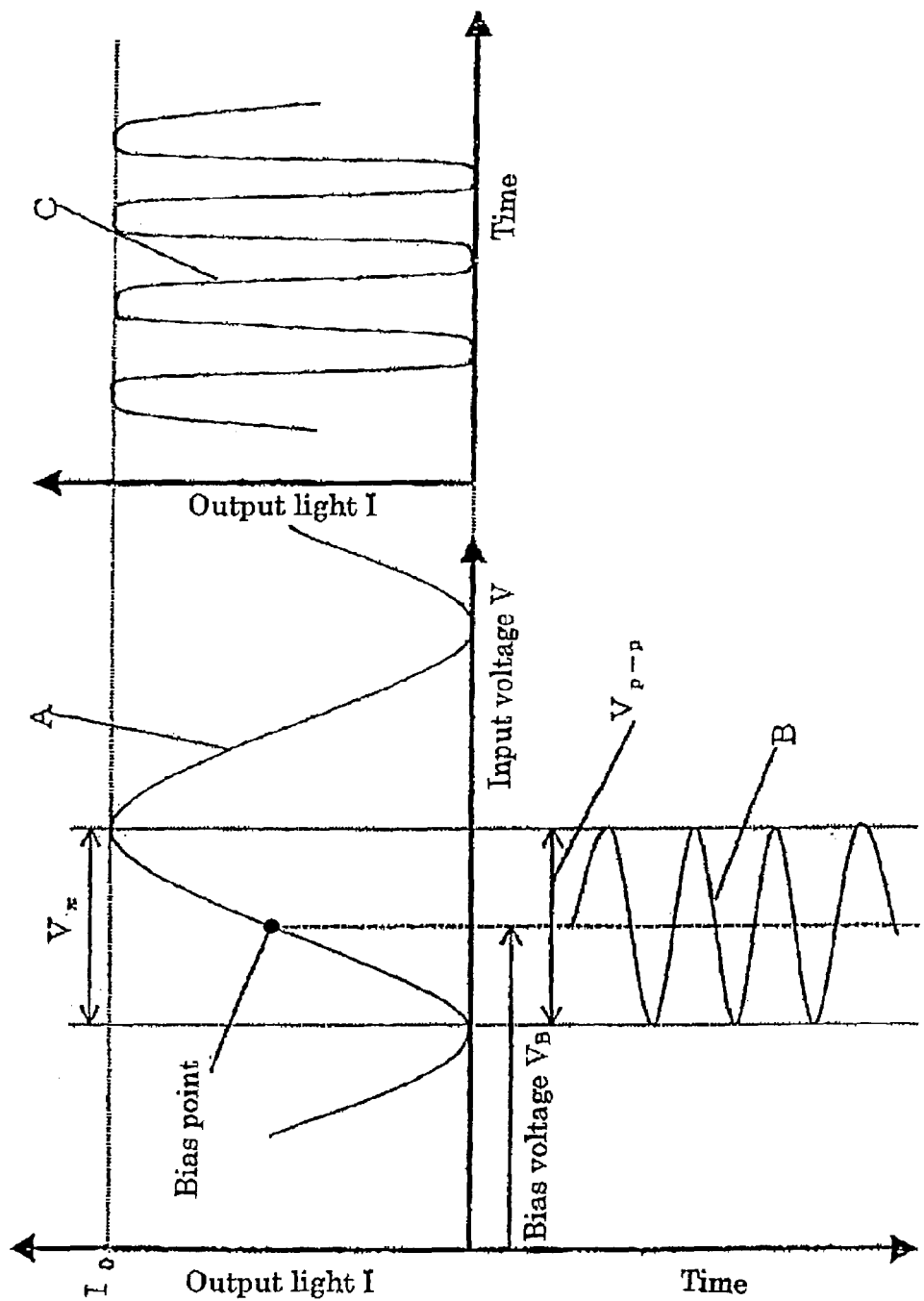
FIG. 4 is a graph, which shows several relations such as V-I characteristic in using the method for measuring of the prior example 1.
Figure 5:
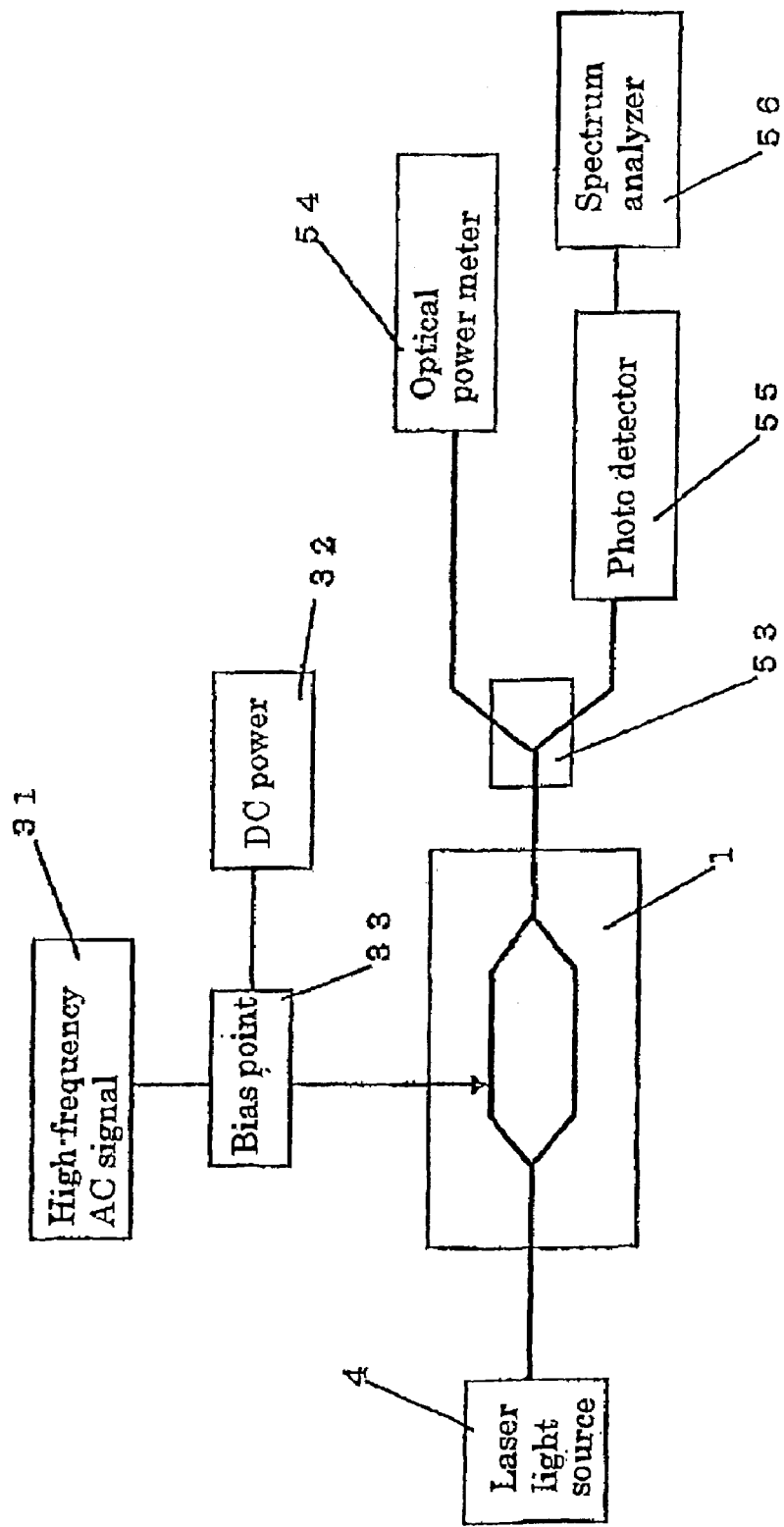
FIG. 5 is a diagrammatic illustration, which shows the method for measuring of the prior example 2.
Figure 6:
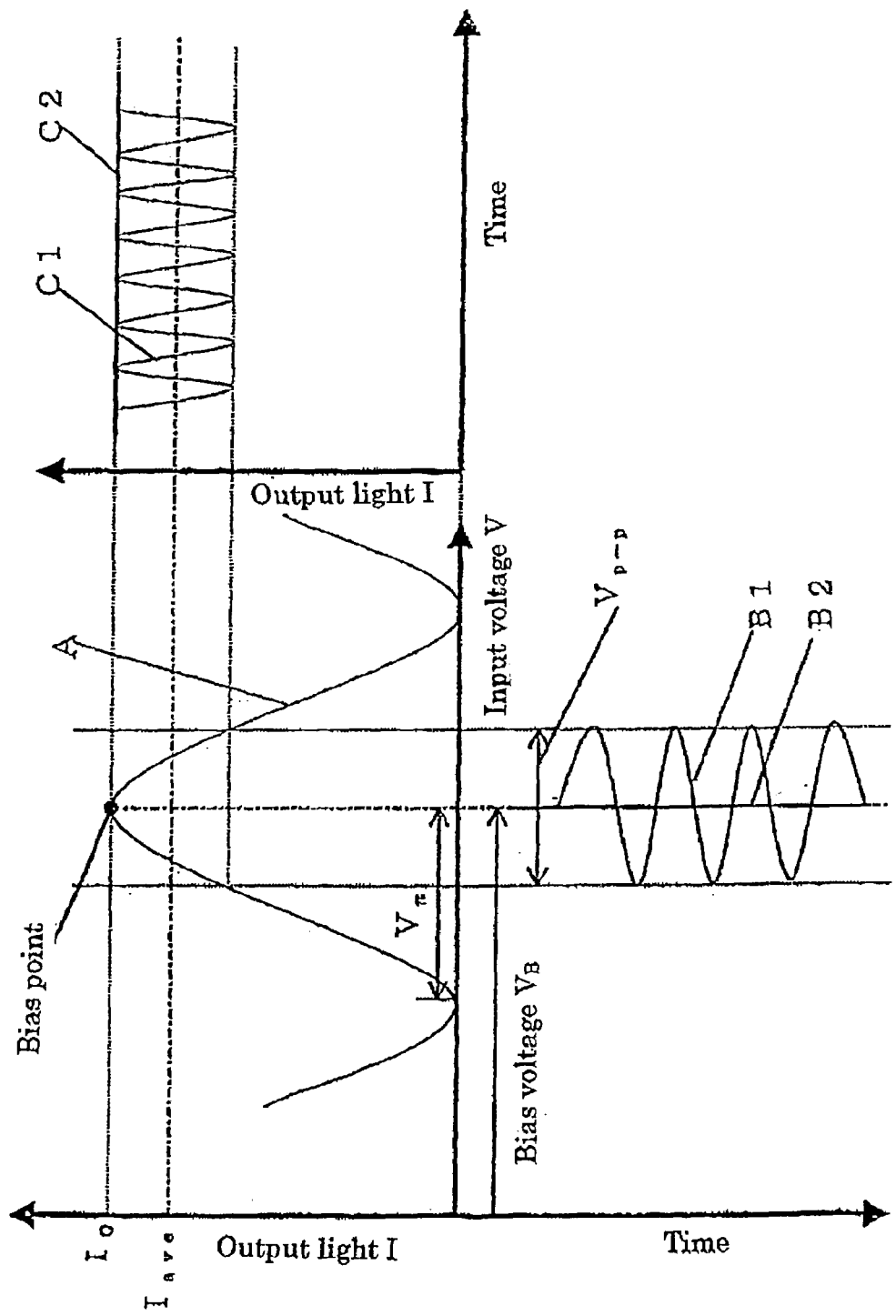
FIG. 6 is a graph, which shows several relations such as V-I characteristic in using the method for measuring of the prior example 2.
Figure 7:
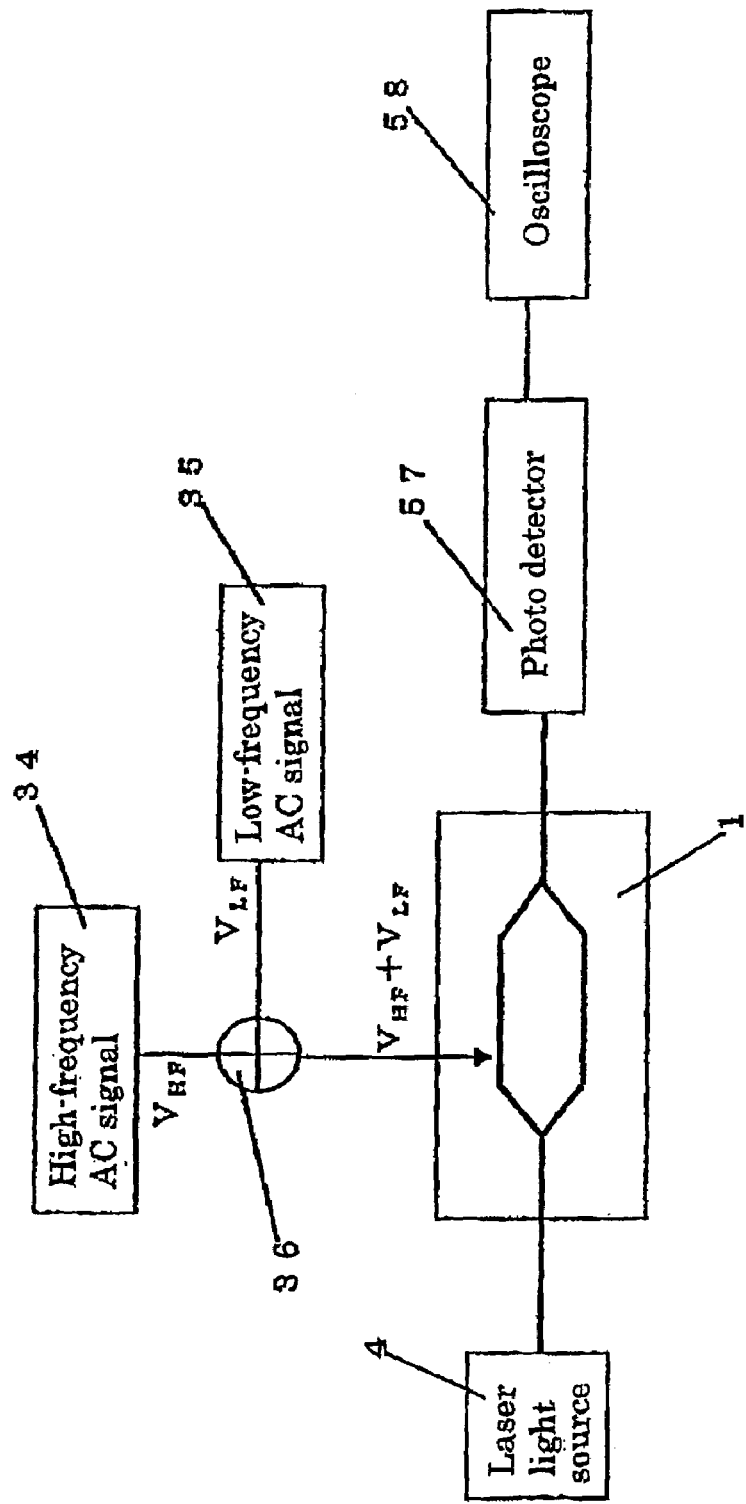
FIG. 7 is a diagrammatic illustration, which shows the method for measuring of the present invention.
Figure 9:
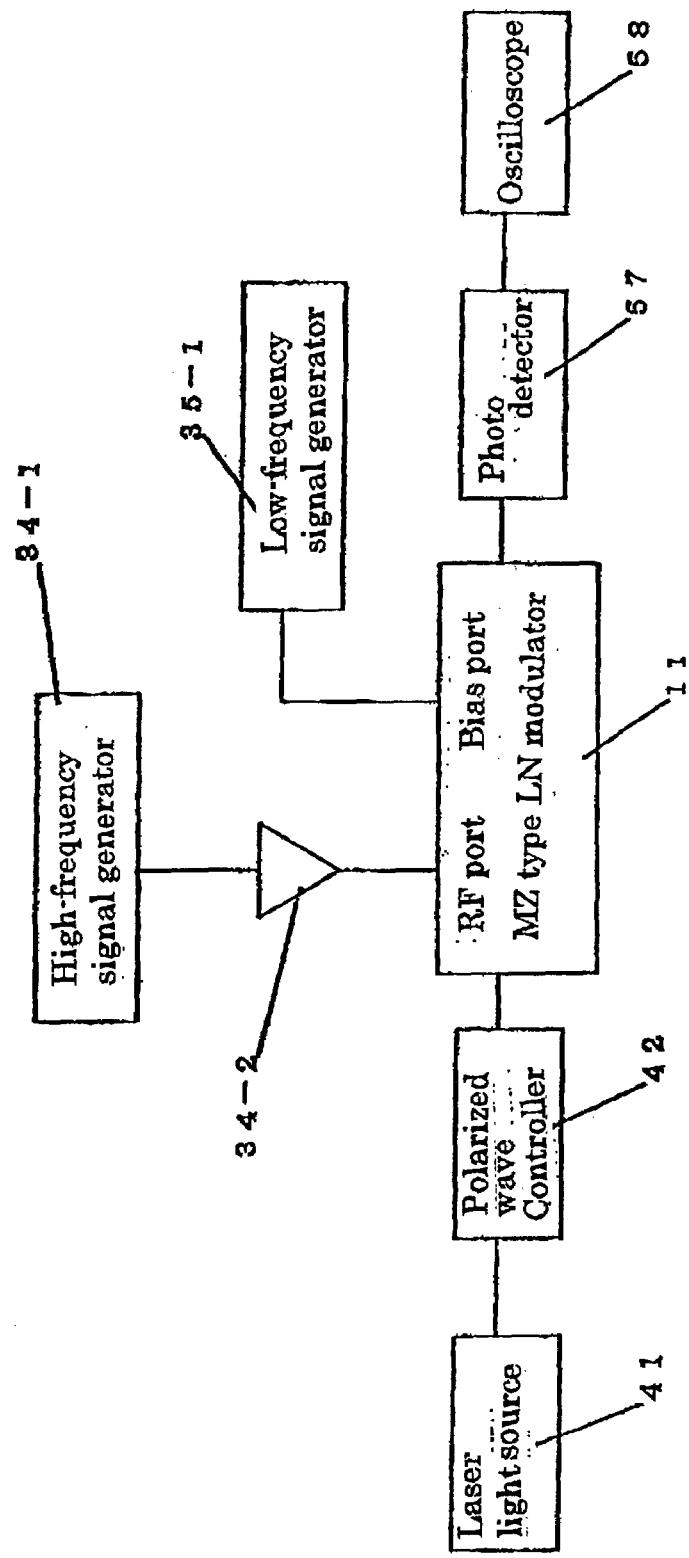
FIG. 9 is a diagrammatic illustration, which shows an experiment example of present invention.

In the present invention, as shown in FIG. 7, after applying a high-frequency AC signal 34 and a monitoring low-frequency AC signal 35 in a superimposed manner to MZ type optical modulator 1, or as shown in FIG. 9, after applying the both respectively to separately constituted electrodes (in concrete terms, RF signal electrode and bias port earth electrode), by observing the low-speed response (the change related to low-frequency AC signal 35) of an output light from the optical modulator 1 by photo detector 57 and oscilloscope 58, and adjusting the voltage amplitude of the high-frequency AC signal 34 in accordance with this observation of the waveform, it makes possible to measure the half-wave voltage of MZ type optical modulator 1.

With the present invention, there is no need to adjust or control bias points, which cause a problem for measuring of MZ type optical modulator, and in addition, it becomes possible to measure accurate half-wave voltage very easily.

The measurement principle of the present invention will be described in the following sentences.

If a phase change by high-frequency AC signal 34 is $\phi 1$ and a phase change by low-frequency AC signal 35 is $\phi 2$, then an output light of M-Z type optical modulator 1 can be indicated as formula 1. $I_0$ represents the maximum value of output light, $V_{p\text{-}p}$ means the peak—peak voltage amplitude value of high-frequency AC signal 34, f is the frequency of the high-frequency AC signal 34 which is frequency under test, $V_\pi$ means the half-wave voltage of MZ type optical modulator 1 at frequency f under test.

Formula 1

$$I = \frac{I_0}{2}[1 + \cos(\Phi_1 + \Phi_2)] \tag{1}$$

$$\Phi_1 = \frac{\pi V_{p\text{-}p}}{2V_\pi}\sin(2\pi f t)$$

In the next place, the low-speed response I' of output light I is equivalent to take time average of high-frequency AC signal (frequency f), and enables to be expressed as formula 2.

Formula 2

$$I' = f\int_0^{1/f} \frac{I_0}{2}[1+\cos(\Phi_1+\Phi_2)]dt \tag{2}$$

$$= f\int_0^{1/f} \frac{I_0}{2}[1+\cos\Phi_1\cos\Phi_2 - \sin\Phi_1\sin\Phi_2]dt$$

Moreover, after expansion into series, formula 2 turns to formula 3.

$$\begin{aligned} I' &= f\int_0^{1/f} \frac{I_0}{2}\left[1 + \cos\left\{\frac{\pi V_{p-p}}{2V_\pi}\sin(2\pi ft)\right\}\cos\Phi_2 - \right.\\ &\qquad \left. \sin\left\{\frac{\pi V_{p-p}}{2V_\pi}\sin(2\pi ft)\right\}\sin\Phi_2 \right] dt \\ &= f\int_0^{1/f} \frac{I_0}{2}\left[1 + \sum_{n=0}^{\infty} \varepsilon_n \cos(2\pi \cdot 2\pi ft) J_{2n}\left\{\frac{\pi V_{p-p}}{2V_\pi}\right\}\cos\Phi_2 - \right.\\ &\qquad \left. \sum_{n=0}^{\infty} 2\sin\{(2n+1)2\pi ft\} J_{2n+1}\left\{\frac{\pi V_{p-p}}{2V_\pi}\right\}\sin\Phi_2 \right] dt \\ &= \frac{I_0}{2}\left[1 + J_0\left(\frac{\pi V_{p-p}}{2V_\pi}\right)\cos\Phi_2\right] \end{aligned} \tag{3}$$

In this regard, $$\varepsilon_n = \begin{cases} 1 & \ldots n = 0 \\ 2 & \ldots n \neq 0 \end{cases}$$

From formula 3, the low-speed response I' of output light of MZ type optical modulator can be expressed in product of constant term, Bessel function at 0 order, and cosine function. At this point, the amount expressed as Bessel function is the change in output light caused by high-frequency AC signal 34, and the amount expressed as cosine function is the change in output light caused by low-frequency AC signal 35.

Figure 8:
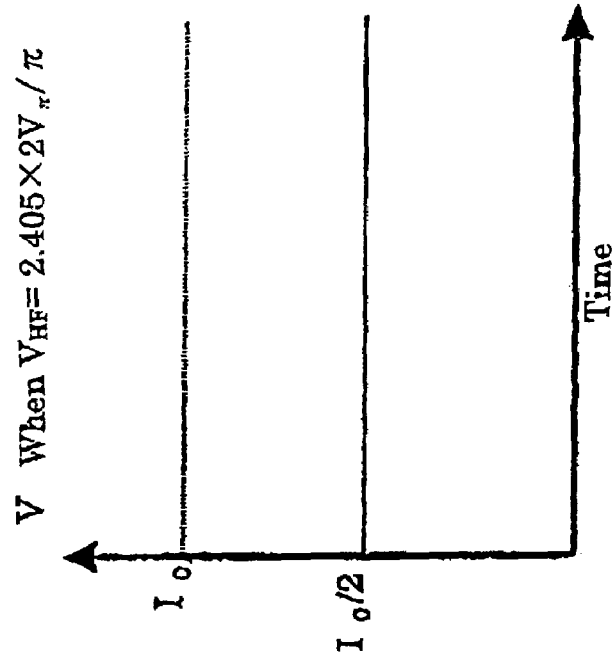
FIG. 8 is a graph, which shows a state change in a low-speed response of output light in using the measuring method of present invention.
Figure 8:
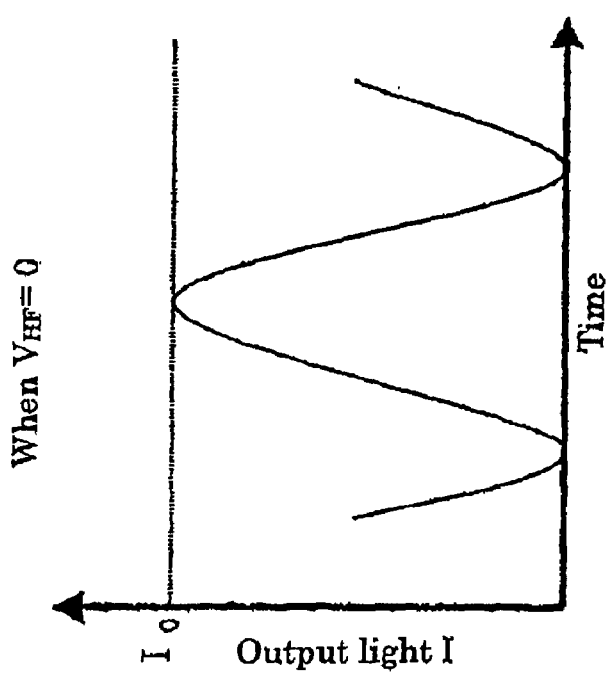

Now, if high-frequency AC signal 34 with voltage $V_{p-p}$ which makes a number of terms of Bessel function 0 is input, the second term of formula 3 becomes 0, and though any low-frequency AC signal 35 is input, low-speed response I' of output light becomes $I_0/2$ which is fixed output light. FIG. 8(*b*) shows this situation.

In other words, as changing continuously the voltage amplitude of high-frequency AC signal 34, which puts in MZ type optical modulator 1, in observing low-speed response of output light from MZ type optical modulator 1 by oscilloscope 58, when a state of the output light that is changing by the effect of low-frequency AC signal as FIG. 8(*a*) becomes constant as shown in FIG. 8(*b*), measuring voltage $V_{p-p}$ of high-frequency AC signal 34 which is input in MZ type optical modulator 1 makes possible to calculate the half-wave voltage $V_\pi$ at frequency under test.

The relationship between $V_{p-p}$ and $V_\pi$ in the case which the low-speed response I' of output light becomes constant can be derived from the condition which make Bessel function's term of formula 3 0, that is $J_0(\pi V_{p-p}/(2V_\mu))=0$ ($J_0$ is Bessel function at 0 order).

However, because there are several conditions in that Bessel function at 0 order becomes 0, normally for minimizing necessary signal voltage, by using the peak—peak voltage amplitude value $V_{p-pmin}$ when output light becomes minimum at first, half-wave voltage value $V_\pi$ is calculated from the relation $\pi V_{p-pmin}/(2V_\pi)=2.405$.

Figure 10:
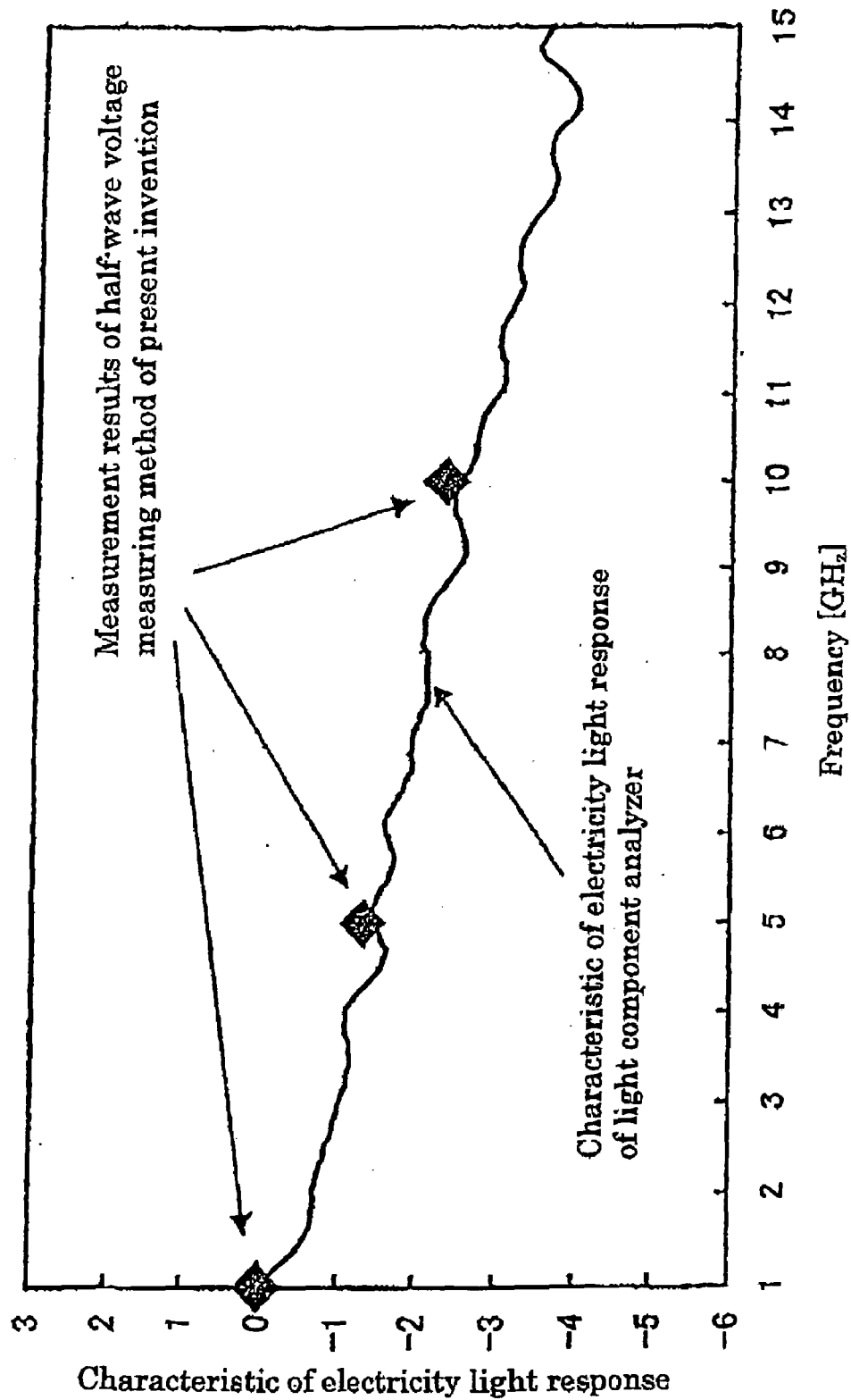
FIG. 10 is a graph, which shows the characteristics of electrical and optical response of MZ type optical modulator in the case of using present invention's measurements.

One example of experiments on the present invention is shown in FIG. 9 and FIG. 10.

1.55 μm laser light from laser light source is entered to MZ type LN optical modulator 11 with adjusting the condition of polarized wave by passing polarized wave controller 42.

High-frequency AC signal at frequency f under test and monitoring low-frequency AC signal is entered in a superimposed manner to LN optical modulator 11. An input of high-frequency AC signal is that high-frequency micro wave from high-frequency signal generator 34-1, in changing the voltage amplitude value of said micro wave by high-frequency amplifier 34-2, is entered to high-frequency RF port of LN optical modulator 11. An input of low-frequency AC signal is that 1 kHz sine wave from low-frequency signal generator 35-1 is entered to BIAS port of LN optical modulator 11. By setting voltage amplitude of low-frequency AC signal for more than double the half-wave voltage, the amplitude value of output light will be the maximum at any time, 80 the observation become easy and it makes possible to measure in much higher precision.

The output light from LN optical modulator 11 is detected by photo detector 57 and the detector signal is observed by oscilloscope 58.

The measurements results of the present invention are that for each frequency under test were 1 GHz, 5 GHz, 10 GHz, half-wave voltage were 4.9V, 5.7V, 6.4V.

FIG. 10 is a graph that compares the characteristics of electrical and optical response of LN optical modulator 11 by using half-wave voltage of these measurement results, with measurements of characteristics of electrical and optical response of LN optical modulator 11 by using a light component analyzer. According to this graph, both results match very closely, and although the measurement of present invention is much simplified compared to usual way, the results catch characteristics of LN optical modulator 11 appropriately, which means that the measurement accuracy of the present invention is extremely fine.

Furthermore, the method and device of present invention are able to automate, for instance, it is able to make up to increase voltage amplitude $V_{p-p}$ of high-frequency AC signal from 0 automatically, store a value of $V_{p-p}$ at the point when fluctuation range of low-speed response I' of output light become within a set value (The more the set value is near 0, the more measurement result becomes accurate. But it is difficult to make it 0 because of the effect of measurement error, so it is desirable to set the value for carrying out effective measurements as usage of measurement results), and calculate half-wave voltage $V_\pi$ by using the value of $V_{p-p}$ in operational equipment which set up separately. Then, by carrying out same method of measuring with changing the frequency under test sequentially, it is possible to measure half-wave voltage over any frequency band automatically.

INDUSTRIAL APPLICABILITY

According to the present invention, only by measuring the minimum value $V_{p-pmin}$ of the voltage amplitude of the high-frequency AC signal when the intensity change of an output light related to the monitoring low-frequency AC signal is almost zero, and substituting it for the formula $\pi V_{p-pmin}/(2V_\pi)=2.405$, half-wave voltage $V_\pi$ of Mach-Zehnder type optical modulator can be measured easily.

In addition, if frequency under test is high frequency, because there is no need to observe high-frequency waveform directly, accurate measurement is possible, and at the same time, because this is not a measuring method which depend on a bias point, there is no need to adjust bias point, and there is no effect from bias point variation of optical modulator.

Furthermore, only $V_{p\text{-}pmin}$ is needed as a parameter to calculate half-wave voltage $V_\pi$, therefore it is possible to offer extremely effective method and device for measuring half-wave voltage of Mach-Zehnder type optical modulator.

The invention claimed is:

1. A method for measuring half-wave voltage of a Mach-Zehnder type optical modulator, comprising the steps of:
    applying a high-frequency AC signal of a frequency under test and a monitoring low-frequency AC signal in a superimposed manner to a Mach-Zehnder type optical modulator, and
    observing low-speed response of an output light from the optical modulator,
    wherein the half-wave voltage at a frequency under test to be measured of the Mach-Zehnder type optical modulator is measured by using voltage amplitude of said high-frequency AC signal when intensity change of an output light by said monitoring low-frequency AC signal is almost zero with voltage amplitude of said high-frequency AC signal kept variable.

2. The method for measuring half-wave voltage of the Mach-Zehnder type optical modulator as claimed in claim 1, wherein the high-frequency AC signal of a frequency under test and the monitoring low-frequency AC signal are both applied respectively to separately constituted electrodes of the Mach-Zehnder type optical modulator.

3. The method for measuring half-wave voltage of the Mach-Zehnder type optical modulator as claimed in claim 1, wherein when intensity change of an output light by said monitoring low-frequency AC signal is almost zero, the relationship between peak—peak voltage amplitude value $V_{P\text{-}P}$ of the voltage amplitude of said high-frequency AC signal and the half-wave voltage value $V_\pi$ of Mach-Zehnder type optical modulator satisfies this relational expression:

$$J_0(\pi V_{P\text{-}P}/(2V_\pi))=0 \ \{J_0 \text{ is Bessel function at 0 order}\}.$$

4. The method for measuring half-wave voltage of the Mach-Zehnder type optical modulator as claimed in claim 2, wherein when intensity change of an output light by said monitoring low-frequency AC signal is almost zero, the relationship between peak—peak voltage amplitude value $V_{P\text{-}P}$ of the voltage amplitude of said high-frequency AC signal and the half-wave voltage value $V_\pi$ of Mach-Zehnder type optical modulator satisfies this relational expression:

$$J_0(\pi V_{P\text{-}P}(2V_\pi))=0 \ \{J_0 \text{ is Bessel function at 0 order}\}.$$

5. The method for measuring half-wave voltage of the Mach-Zehnder type optical modulator as claimed in claim 1, wherein, in a case of setting a minimum value of peak—peak voltage amplitude value of the voltage amplitude of said high-frequency AC signal when the intensity change of an output light by said monitoring low-frequency AC signal is almost zero, as $V_{P\text{-}Pmin}$, the half-wave voltage value $V_\pi$ of Mach-Zehnder type optical modulator satisfies this relational expression:

$$\pi V_{P\text{-}Pmin}/(2V_\pi)=2.405.$$

6. The method for measuring half-wave voltage of the Mach-Zehnder type optical modulator as claimed in claim 2, wherein, in a case of setting a minimum value of peak—peak voltage amplitude value of the voltage amplitude of said high-frequency AC signal when the intensity change of an output light by said monitoring low-frequency AC signal is almost zero, as $V_{P\text{-}Pmin}$, the half-wave voltage value $V_\pi$ of Mach-Zehnder type optical modulator satisfies this relational expression:

$$\pi V_{P\text{-}Pmin}/(2V_\pi)=2.405.$$

7. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 1.

8. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 2.

9. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 3.

10. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 4.

11. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 5.

12. A device for measuring half-wave voltage of a Mach-Zehnder type optical modulator that makes it possible to measure half-wave voltage of the Mach-Zehnder type optical modulator, by using the method for measuring half-wave voltage of the Mach-Zehnder type optical modulator as claimed in claim 6.

* * * * *